United States Patent
Marszalek et al.

(10) Patent No.: US 7,154,039 B1
(45) Date of Patent: Dec. 26, 2006

(54) SYSTEM AND METHOD FOR SECURING AND/OR FOR ALIGNING A DEVICE

(75) Inventors: Christopher Marszalek, Plainfield, IL (US); Daniel Horvath, Marseilles, IL (US)

(73) Assignee: Sennco Solutions, Inc., Plainsfield, IL (US)

( * ) Notice: Subject to any disclaimer, the term of this patent is extended or adjusted under 35 U.S.C. 154(b) by 0 days.

(21) Appl. No.: 11/294,293

(22) Filed: Dec. 5, 2005

(51) Int. Cl.
*H02G 3/08* (2006.01)

(52) U.S. Cl. .......................... 174/50; 174/59; 174/135; 439/501; 220/4.02

(58) Field of Classification Search .................. 174/50, 174/59, 53, 60, 50.52, 135, 17 R; 439/501, 439/502, 535; 280/47.19, 47.2, 47.26; 191/12.4; 220/4.02, 3.8, 3.6; 248/906
See application file for complete search history.

(56) References Cited

U.S. PATENT DOCUMENTS

| | | | |
|---|---|---|---|
| 5,124,685 A | 6/1992 | Rankin | |
| 5,552,771 A | 9/1996 | Leyden et al. | |
| 5,565,848 A | 10/1996 | Leyden et al. | |
| 5,679,925 A * | 10/1997 | Dilley | 174/53 |
| 5,773,757 A * | 6/1998 | Kenney et al. | 174/53 |
| 6,019,304 A | 2/2000 | Skowronski et al. | |
| 6,027,277 A | 2/2000 | Leyden et al. | |
| 6,039,498 A | 3/2000 | Leyden et al. | |
| RE37,590 E | 3/2002 | Leyden et al. | |
| 6,386,906 B1 | 5/2002 | Burke | |
| 6,433,274 B1 * | 8/2002 | Doss et al. | 174/50 |
| 6,670,552 B1 * | 12/2003 | Kuroda et al. | 174/59 |
| 6,702,608 B1 * | 3/2004 | Brennan, Jr. | 439/501 |
| 6,799,994 B1 | 10/2004 | Burke | |
| 7,000,746 B1 * | 2/2006 | Mackin et al. | 191/12.4 |
| 7,025,627 B1 * | 4/2006 | Rosenthal et al. | 439/501 |

* cited by examiner

*Primary Examiner*—Dhiru R. Patel
(74) *Attorney, Agent, or Firm*—Patents +TMS, P.C.

(57) ABSTRACT

A system and a method secure and/or align a device attached to a fixture. The system and the method have a retractable reel with a cable for attaching, for connecting and/or for securing the device to the fixture. The system and the method have a housing with an opening and a slit for aligning and/or for centering the device with respect to the housing, the retractable reel and/or the fixture. The cable extends outward with respect to the retractable reel and/or extends through the housing via the opening. The system and the method have a connector for attaching, for connecting and/or for securing the cable to the device. The housing has a recession for receiving the connector and/or for aligning the connector and/or the device. The connector and/or the device is centered and/or is aligned with respect to the recession, the housing and/or the retractable reel via the opening in the housing and the cable. A fastener and/or an adhesive connects, secures and/or attaches the device to the connector and/or the housing to an exterior surface of the fixture.

20 Claims, 2 Drawing Sheets

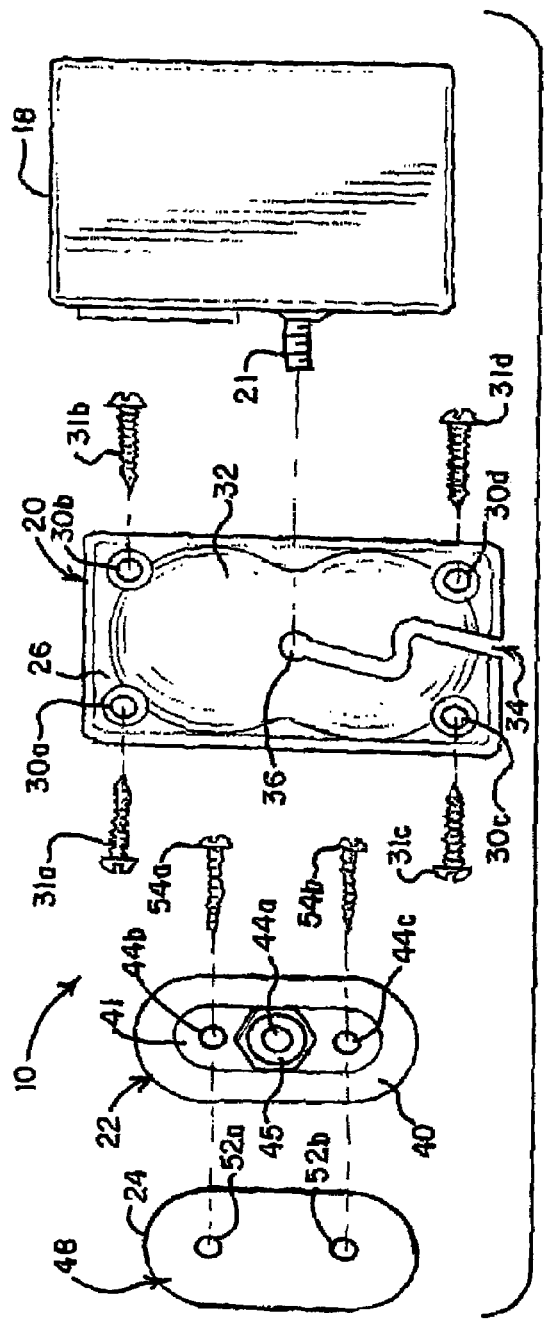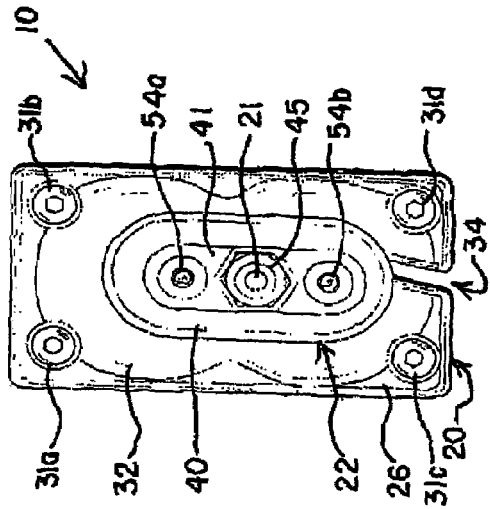
FIG.1
FIG.2

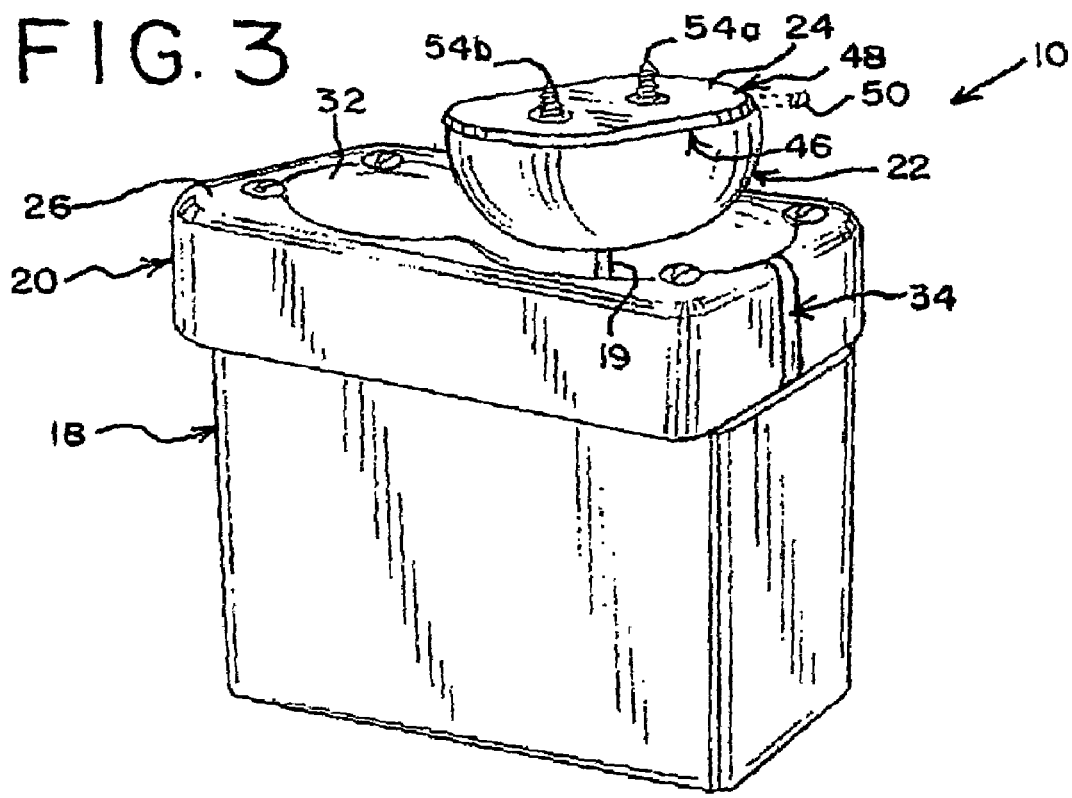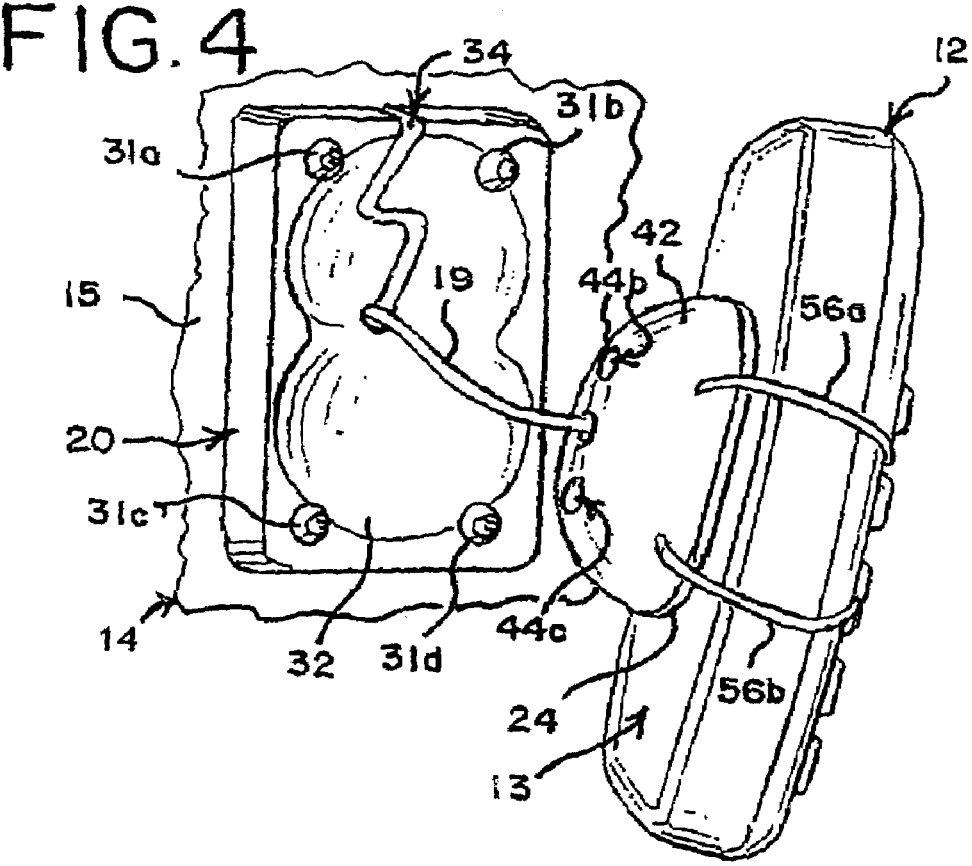

SYSTEM AND METHOD FOR SECURING AND/OR FOR ALIGNING A DEVICE

BACKGROUND OF THE INVENTION

The present invention generally relates to a system and a method for securing and/or for aligning a device. More specifically, the present invention relates to a system and a method for securing and/or for aligning a portable electronic device (hereinafter "the device"), such as, for example, a camera, a camcorder, a digital camera, a digital music player, a video game, a digital video player, a digital video recorder, a personal data assistant (hereinafter "a PDA"), a cellular telephone and/or the like. The system and the method for securing and/or for aligning the device may be used to prevent theft of and/or to prevent destruction of the device. The system and the method may secure the device to a fixture for displaying by a retailer, a wholesaler and/or the like.

The system and the method for securing and/or for aligning the device may have a retracting reel with a cable for attaching the device to the fixture. The system may have a housing with an opening and/or a slit for aligning the device with respect to the reel, the housing and/or the fixture. The cable may extend outward with respect to the reel and/or may extend through the housing via the slit and/or the opening. The system may have a connector for attaching the cable and/or the reel to the device. The housing may have a recession which may be sized to receive the connector for aligning the device with respect to the housing. As a result, the connector and/or the device may be centered with respect to the housing and/or the reel. One or more fasteners may connect, may secure and/or may attach the device to the connector and/or the housing to an exterior surface of the fixture. A first side of the connector may have an adhesive for attaching and/or for connecting the device to the connector.

It is generally known, for example, that vendors, retailers and/or wholesalers may display a device to a customer at, for example, a retail store and/or sales facility. The device may be a portable device, such as, for example, a camera, a digital camera, a digital media player, a portable compact disc player, a PDA and/or a cellular telephone. The device is traditionally displayed in conjunction with a fixture, such as, for example, a cabinet, a table, a wall, a column, a shelf and/or the like. A cable attaches and/or secures the device to the fixture.

The device is often fixed and/or secured to an exterior surface of the fixture, and the cable attaching the device to the fixture has a length which is not adjustable. Accordingly, the customer and/or the user may not be able to pick up and/or to move the device to examine the device, such as, to examine various characteristics of the device, such as, for example, the weight, the texture, the feel, the configuration of the device and/or the like. A longer cable incorporated with the device and/or the fixture allows the customer and/or the user to examine the device. However, the longer cable is impractical and/or tangles with other cables and/or the device or other devices.

A connector attaches and/or affixes the device to the cable. Traditionally, a housing is attached to an exterior surface of the fixture for displaying the device on the exterior surface of the fixture. The device may be displayed in conjunction with the housing on the exterior surface of the fixture. A customer may remove the device from the housing to examine the characteristics of the device with the device remaining secured to the fixture via the cable. After examining the characteristics of the device, the user may return the device to the housing and/or the exterior surface of the fixture. However, the device and/or the cable may be misaligned with respect to the housing and/or the fixture. As a result, the device may separate from the housing and/or may be damaged from misalignment with the housing. Further, the housing and/or the cable may be damaged and/or may be destroyed by misalignment of the device with respect to the housing and/or the fixture. Moreover, the connector attaching the device to the cable may be separated from the device. As a result, the device may be damaged, may be destroyed and/or may be stolen by the customer and/or the user.

A need, therefore, exists for a system and a method for securing and/or for aligning a device which may be displayed in conjunction with an exterior surface of a fixture. Additionally, a need exists for a system and a method for securing and/or for aligning the device which may provide a retractable reel with a cable for removing the device from the exterior surface of the fixture for examination and/or the like. Further, a need exists for a system and a method for securing and/or for aligning the device which may provide a housing having an opening and/or a slit for attaching to the exterior surface of the fixture. The housing may display, may receive and/or may secure the device, a cable and/or a connector to the fixture and/or the retractable reel. Still further, a need exists for a system and a method for securing and/or for aligning the device which may provide a recession in the housing sized to receive the connector for displaying and/or for securing the device and/or the connector to the housing and/or exterior surface of the fixture. Moreover, a need exists for a system and a method for securing and/or for aligning the device which may provide one or more fasteners for attaching and/or for connecting the device to the connector and/or the housing to the exterior surface of the fixture. Furthermore, a need exists for a system and a method for securing and/or for aligning the device which may provide an adhesive on a side of the connector for securing, for connecting and/or for attaching the device to the connector.

SUMMARY OF THE INVENTION

The present invention relates to a system and a method for securing and/or for aligning a portable electronic device. Further, the system and the method for securing and/or for aligning the device may attach, may connect and/or may secure the device to an exterior surface of a fixture via a housing, a connector and/or a cable. The system and the method for securing and/or for aligning the device may have a retractable reel and/or one or more fasteners to attach, to connect and/or to secure the device to the cable and/or to the fixture, respectively. The housing may have a recession, an opening and/or a slit for aligning and/or for centering the device with respect to the housing, the retractable reel and/or the exterior surface of the fixture. The retractable reel may allow the cable to be pulled, to be moved and/or to be extendable outward with respect to the exterior surface of the fixture and/or the housing which may allow the device to be manipulated and/or to be examined by a customer and/or a user. The connector may have one or more fasteners and/or an adhesive for attaching, for connecting and/or for securing the device to the connector, the housing, the fixture and/or the retractable reel.

To this end, in an embodiment of the present invention, a system for securing a device to a fixture is provided. The system has a housing having a first side and a second side wherein the first side is opposite to the second side wherein the first side of the housing has a recession extending inward with respect to the second side of the housing and further wherein the housing has an opening extending from the recession through the housing to the second side of the housing. Further, the system has a cable having a length defined between a first end and a second end wherein the cable extends through the opening of the housing. Still further, the system has a retractable reel connected to the second end of the cable wherein the retractable reel is adjacent to the second side of the housing wherein the first end of the cable extends from the first side of the housing. Moreover, the system has a connector having a first side and a second side wherein the first side is opposite to the second side wherein the connector has walls defining an exterior surface wherein the first end of the cable is connected to the connector wherein the device connects to the first side of the connector wherein the recession is sized to receive the connector wherein the first end of the cable moves inward with respect to the housing and further wherein the opening in the housing aligns the connector with respect to the recession.

In an embodiment, the system has a layer adhered to the first side of the connector wherein the layer attaches the device to the connector.

In an embodiment, the system has a receptor connected to the connector wherein the receptor has an opening to receive the first end of the cable.

In an embodiment, the system has a slit formed in the housing wherein the slit receives the cable.

In an embodiment, the system has a fastener connected to the first end of the cable wherein the fastener attaches the cable to the connector.

In an embodiment, the system has a fastener extending outward with respect to the exterior surface of the connector wherein the fastener attaches the device to the connector.

In another embodiment of the present invention, a system for aligning a device wherein the device is secured to a fixture is provided. The system has a housing having a perimeter defined by edges and a length defined between a first end and a second end wherein the first end of the housing has a recession extending inward with respect to the second end of the housing wherein the housing has a slit extending from the perimeter inward with respect to the recession wherein the slit extends from the recession through the housing to the second side of the housing. Further, the system has a cable having a length defined between a first end and a second end wherein the cable extends through the housing via the slit wherein the slit is sized to receive the cable wherein the first end of the cable extends from the first side of the housing wherein the second end of the cable is connected to the fixture. Moreover, the system has a connector having walls defining an exterior surface wherein the first end of the cable is connected to the connector wherein the device is attached to the exterior surface of the connector wherein the first end of the cable moves inward with respect to the recession of the housing wherein the slit of the housing aligns the connector with respect to the recession of the housing wherein the recession of the housing is sized to receive the exterior surface of the connector.

In an embodiment, the system has a retractable reel attached to the second end of the cable wherein the retractable reel moves the first end of the cable inward with respect to the first side of the housing.

In an embodiment, the system has a layer adhered to the exterior surface of the connector wherein the layer attaches the device to the exterior surface of the connector.

In an embodiment, the system has a fastener connected to the first end of the cable wherein the fastener attaches the cable to the connector.

In an embodiment, the system has a receptor connected to the connector wherein the receptor has an opening to receive the first end of the cable.

In an embodiment, the system has an attaching means extending from the exterior surface of the connector wherein the connector clamps the device to the connector.

In another embodiment of the present invention, a method for securing a device to an exterior surface of a fixture is provided. The method has the step of forming an opening in a housing wherein the housing has a first side and a second side wherein the first side is opposite to the second side wherein the first side of the housing has a recession extending inward with respect to the second side wherein the opening extends from the recession through the housing to the second side of the housing. Further, the method has the step of inserting a cable into the opening of the housing wherein the cable has a length defined between a first end and a second end wherein the first end of the cable is connectable to the fixture and the second end extends from the first side of the housing. Still further, the method has the step of connecting the first end of the cable to a connector having walls defining an exterior surface wherein the recession of the housing is sized to receive the exterior surface of the connector. Moreover, the method has the step of aligning the connector with respect to the recession via the cable and the opening in the housing wherein the first end of the cable and the connector move inward with respect to the first side of the housing wherein the connector is insertable into the recession of the housing.

In an embodiment, the method has the step of attaching the housing to the exterior surface of the fixture.

In an embodiment, the method has the step of adhering a layer to the exterior surface of the connector.

In an embodiment, the method has the step of attaching the device to the connector.

In an embodiment, the method has the step of connecting the first end of the cable to the connector.

In an embodiment, the method has the step of forming a slit in the housing wherein the slit extends from the recession through the housing to the second side of the housing wherein the slit receives the cable.

In an embodiment, the method has the step of displaying the device on the exterior surface of the fixture.

In an embodiment, the method has the step of removing the cable from the opening in the housing.

It is, therefore, an advantage of the present invention to provide a system and a method for securing and/or for aligning a device.

Another advantage of the present invention is to provide a system and a method for securing and/or for aligning a device which may allow a user to remove the device from an exterior surface of a fixture to examine characteristics of and/or to manipulate the device without detaching the device from the fixture.

And, another advantage of the present invention is to provide a system and a method for securing and/or for aligning a device which may provide a housing for displaying, for connecting and/or for attaching the device to an exterior surface of a fixture.

Yet another advantage of the present invention is to provide a system and a method for securing and/or for aligning a device which may provide an opening and/or a slit in a housing attachable to an exterior surface of a fixture for receiving a cable attached to the device.

A further advantage of the present invention is to provide a system and a method for securing and/or for aligning a device which may provide a connector attachable to the device and/or a cable of a retractable reel for securing, for attaching and/or for connecting the device to a fixture.

Moreover, an advantage of the present invention is to provide a system and a method for securing and/or for aligning a device which may provide one or more fasteners for attaching, for securing and/or for connecting the device to a connector and/or a cable.

And, another advantage of the present invention is to provide a system and a method for securing and/or for aligning a device which may provide one or more fasteners for attaching, for securing and/or for connecting a housing to an exterior surface of a fixture.

Yet another advantage of the present invention is to provide a system and a method for securing and/or for aligning a device which may provide a recession in a housing which may be sized to receive a connector attached to the device for displaying and/or for securing the device to an exterior surface of a fixture.

Another advantage of the present invention is to provide a system and a method for securing and/or for aligning a device which may provide an adhesive layer on a side of a connector for attaching, for securing and/or for connecting the device to the connector and/or a cable.

Yet another advantage of the present invention is to provide a system and a method for securing and/or for aligning a device which may provide a housing having a recession, an opening and/or a slit for aligning and/or for centering a connector and/or the device with respect to the housing, a retractable reel and/or a fixture.

A still further advantage of the present invention is to provide a system and a method for securing and/or for aligning a device which may provide one or more holes in a connector for securing and/or for attaching the device to the connector.

Moreover, an advantage of the present invention is to provide a system and a method for securing and/or for aligning a device which may provide an opening in a housing for reducing friction of a cable against the housing and/or for increasing longevity of the cable and/or the housing.

And, another advantage of the present invention is to provide a system and a method for securing and/or for aligning a device which may provide a receptor in an interior of a connector for attaching and/or for connecting a cable and/or a retractable reel to the connector.

Yet another advantage of the present invention is to provide a system and a method for securing and/or for aligning a device which may provide a protective layer for preventing damage from a connector to a device attachable to the connector.

Another advantage of the present invention is to provide a system and a method for securing and/or for aligning a device which may provide a retractable reel having a cable for attaching the device to a fixture and/or the retractable reel.

Additional features and advantages of the present invention are described in, and will be apparent from, the detailed description of the presently preferred embodiments and from the drawings.

BRIEF DESCRIPTION OF THE DRAWINGS

FIG. 1 is a front plan view of a system for securing and/or for aligning a device in an embodiment of the present invention.

FIG. 2 is a front plan view of a system for securing and/or for aligning a device in an embodiment of the present invention.

FIG. 3 is a side plan view of a system for securing and/or for aligning a device in an embodiment of the present invention.

FIG. 4 is a perspective view of a system for securing and/or for aligning a device in an embodiment of the present invention.

DETAILED DESCRIPTION OF THE PREFERRED EMBODIMENTS

The present invention relates to a system and a method for securing and/or for aligning a device. The system and the method for securing and/or for aligning the device may have a retractable reel, a cable and/or a connector for attaching, for connecting and/or for securing the device to a fixture. A housing may be attached to and/or may be connected to an exterior surface of the fixture for displaying, for connecting and/or for attaching the connector and/or the device to the exterior surface of the device. The housing may have an opening, a slit and/or a recession which may be sized to receive the cable and/or the connector for displaying, for connecting and/or for securing the device to the exterior surface of the fixture. One or more fasteners may attach, may secure and/or may connect the device to the connector and/or the housing to the exterior surface of the fixture. An end of the connector may have an adhesive for connecting, for attaching and/or for securing the device to the connector, the retractable reel and/or the fixture. Furthermore, the cable may extend outward with respect to the retractable reel, the housing and/or the exterior surface of the fixture. As a result, the device may be removed from the housing to be manipulated and/or to be examined by a customer and/or a user.

Referring now to the drawings wherein like numerals refer to like parts, FIGS. 1–4 illustrate a system 10 which may secure a device 12 to a fixture 14 for displaying the device 12 in conjunction with an exterior surface 15 of the fixture 14. The system 10 may include a retractable reel 18, a housing 20, a connector 22 and/or an adhesive layer 24. The retractable reel 18 may have a cable 19 which may be extendable outward with respect the retractable reel 18. A fastener 21 may be connected to and/or may be attached to the cable 19 for securing the connector 22 and/or the device 12 to the retractable reel 18. The device 12 may be an electronic device, such as, for example, a camera, a camcorder, a digital camera, a digital music player, a video game, a digital video player, a digital video recorder, a personal data assistant (hereinafter "a PDA"), a cellular telephone and/or the like. Further, the device 12 may have an underside 13 for securing the device 12 to the connector 22 and/or the fixture 14. The present invention should not be deemed as limited to the embodiments of a specific device. It should be understood that the device may be any electronic device as known to one of ordinary skill in the art.

The housing 20 may be attached and/or may be connected to an exterior surface 15 of the fixture 14. The fixture 14 may be, for example, a wall, a floor, a pillar, a support beam, a stair case or a fixture, such as, for example, a cabinet, a table, a shelf and/or the like. The present invention should not be deemed as limited to the embodiments of a specific structural element and/or a specific fixture 14. It should be understood that the fixture 14 may be any structural element and/or any fixture as known to one of ordinary skill in the art.

The retractable reel 18 may be located in an interior (not shown in the figures) of the fixture 14. The fastener 21 and/or the cable 19 of the retractable reel 18 may extend outward with respect to the exterior surface 15 of the fixture 14. The fastener 21 may move inward or outward with respect to the exterior surface 15 of the fixture 14 via the retractable reel 18. The retractable reel 18 may be attached to, may be secured to and/or may be connected to the fixture 14. As a result, the fastener 21 and/or the cable 19 may be attached to, may be secured to and/or may be connected to the fixture 14.

The housing 20 may have a top side 26 and/or a bottom side 28 wherein the bottom side 28 is opposite to the top side 26. The housing 20 may have passages 30a–30d which may extend from the top side 26 through the housing 20 to the bottom side 28. Fasteners 31a–31d may be insertable into the passages 30a–30d, respectively, to attach, to secure and/or to connect the housing 20 to the exterior surface 15 of the fixture 14. The passages 30a–30d may be sized to receive the fasteners 31a–31d, respectively, to attach, to secure and/or to connect the housing 20 to the fixture 14. The fasteners 31a–31d and/or the housing 20 may attach to and/or may connect to the exterior surface 15 of the fixture 14 for securing the housing 20 to the fixture 14. The bottom side 28 of the housing 20 may be adjacent to and/or may abut the exterior surface 15 of the fixture 14. The top side 26 may extend outward with respect to the exterior surface 15 of the fixture 14. The fasteners 31a–31d may be, for example, screws, nails and/or the like. It should be understood that the fasteners 31a–31d may be any type of fasteners and/or any number of fasteners as known to one of ordinary skill in the art.

The housing 20 may have a recession 32 which may extend inward with respect to the top side 26 of the housing 20 and/or the exterior surface 15 of the fixture 14. The recession 32 may be sized to receive the connector 22 for displaying the device 12. A slit 34 and/or an opening 36 may be formed in the housing 20. The slit 34 and/or the opening 36 may extend through the housing 20 from the recession 32 to the bottom side 28 of the housing 20. The opening 36 may be centered with respect to the recession 32, the housing 20 and/or the retractable reel 18. The slit 34 and/or the opening 36 may be sized to receive the cable 19 of the retractable reel 18. The opening 36 may be sized to prevent friction between the cable 19 and/or the housing 20 for increasing the longevity of the cable 19 and/or the system 10.

The cable 19 may move inward and/or outward with respect to the slit 34 and/or the opening 36. The cable 19 may be insertable into the opening 36 of the housing 20 via the slit 34. As a result, the cable 19 may be located inside the slit 34 and/or the opening 36 of the housing 20. The cable 19 and/or the fastener 21 may be centered with respect to the recession 32, the housing 20 and/or the retractable reel 18 via the opening 36. The housing 20 may be located between the fastener 21 and the retractable reel 18 and/or the exterior surface 15 of the fixture 14.

The connector 22 may have a top side 38 and/or a bottom side 40 which may be opposite to the top side 38. The connector 22 may have walls 39 defining an interior surface 41 and/or an exterior surface 42. The connector 22 may have holes 44a–44c which may extend from the interior 41 through the connector 22 to the exterior surface 42. The exterior surface 42 of the connector 22 may be sized to be insertable into the recession 32 of the housing 20. The exterior surface 42 may have, for example, a circular shape, an oval shape and/or the like. A shape of the recession 32 may correspond to a shape of the exterior surface 42 of the connector 20. It should be understood that the shape of the exterior surface 42 of the connector 22 may be any shape as known to one of ordinary skill in the art.

A receptor 45 may be located in the interior 41 of the connector 22. The receptor 45 may be aligned with the hole 44a for attaching the cable 19 of the retractable reel 18 to the connector 22. The receptor 45 may be, for example, a nut and/or the like. The fastener 21 of the retractable reel 18 may be insertable into the hole 44a and/or the receptor 45. As a result, the fastener 21 may extend inward with respect to the interior 41 of the connector 22 for attaching the fastener 21 to the connector 22. The fastener 21 may be attached to, may be secured to and/or may be connected to the receptor 45 of the connector 22. As a result, the connector 22 may be attached to, may be secured to and/or may be connected to the cable 19, the retractable reel 18, the housing 20 and/or the fixture 14. The present invention should not be limited to a specific embodiment of the receptor 45. It should be understood that the receptor 45 may be any receptor as known to one of ordinary skill in the art.

The adhesive layer 24 may have a first side 46 and/or a second side 48 which is opposite to the first side 46. A protective layer 50 may be juxtaposed and/or may be located between the first side 46 and the second side 48 of the adhesive layer 24. The protective layer 50 may be made from a material, such as, for example, foam, fibers, cloth and/or the like. The first side 46 of the adhesive layer 24 may be adhered to, may be connected to and/or may be attached to the bottom side 40 of the connector 22. As a result, the adhesive layer 24 and/or the protective layer 50 may be attached to, may be connected to and/or may be secured to the connector 22, the cable 19, the housing 20, the retractable reel 18 and/or the fixture 14. The present invention should not be deemed as limited to a specific embodiment of the material of the protective layer 50. It should be understood that protective layer 50 may be made from any material as known by one of ordinary skill in the art.

The adhesive layer 24 may have openings 52a, 52b which may extend from the first side 46 through the adhesive layer 24 and/or the protective layer 50 to the second side 48. The openings 52a, 52b may be aligned with and/or may be correspond to the holes 44b, 44c of the connector 22. The second side 48 of the adhesive layer 24 may adhere to, may attach to and/or may connect to the underside 13 of the device 12. As a result, the device 12 may be attached to, may be connected to and/or may be secured to the connector 22, the cable 19, the housing 20, the retractable reel 18 and/or the fixture 14 via the adhesive layer 24. The adhesive layer 24 and/or the protective layer 50 may be located between the connector 22 and/or the device 14. The protective layer 50 may prevent damage of the device 12 during attachment to the connector 22.

Fasteners 54a, 54b may be insertable into the holes 44b, 44c, respectively, of the connector 22 and/or the openings 52a, 52b, respectively, of the adhesive layer 24. The fasteners 54a, 54b may be, for example, a screw, a bolt and/or the like. The fasteners 54a, 54b may extend from the top side 38 and/or the exterior surface 42 of the connector through the connector 22 and/or through the adhesive layer 24 outward with respect to the second side 48 of the adhesive layer 24. The fasteners 54a, 54b may be insertable into holes (not shown in the figures) in the underside 13 of the device 12.

The fasteners 54a, 54b may be attached to and/or may be connected to the underside 13 of the device 12. As a result, the device 12 may be attached to, may be connected to and/or may be secured to the connector 22, the cable 19, the housing 20, the retractable reel 18 and/or the fixture 14 via the fasteners 54a, 54b. The adhesive layer 24 and/or the protective layer 50 may prevent damage of the device 12 during attachment to the connector 22 via the fasteners 54a, 54b. It should be understood that the fasteners 54a, 54b may be any fastener which may be capable of securing the device 12 to the connector 22 as known to one of ordinary skill in the art.

The system 10 may have clamping devices 56a, 56b which may extend outward with respect to the exterior surface 42 of the connector 22. The clamping devices 56a, 56b may be, for example, straps, wires, cords, cables and/or the like. The clamping devices 56a, 56b may clamp around the device 12 to attach and/or to connect the device 12 to the connector 22. The device 12 may be located between the clamping devices 56a, 56b and the connector 22, the protective layer 50 and/or the adhesive layer 24. As a result, the device 12 may be attached to, may be connected to and/or may be secured to the connector 22, the cable 19, the housing 20, the retractable reel 18 and/or the fixture 14 via the clamping devices 56a, 56b. The protective layer 50 may prevent damage of the device 12 during attachment to the connector 22 via the clamping devices 56a, 56b. It should be understood that the clamping devices 56a, 56b may be any clamping device capable of securing the device 12 to the connector 22 as known to one of ordinary skill in the art.

The adhesive layer 24 may be placed against the underside 13 of the device 12. The holes in the underside 13 of the device 12 may be formed in the underside 13 of the device 12. The holes in the underside of the device may correspond to the openings 52a, 52b of the adhesive layer 24. A user (not shown in the figures) may insert and/or may attach the device 12 to the connector 22 via the fasteners 54a, 54b and the holes in the underside 13 of the device.

The device 12 may be attached to, may be connected to and/or may be secured to the connector 22, the cable 19, the housing 20, the retractable reel 18 and/or the fixture 14 via the fastener 21, the fasteners 54a, 54b, the adhesive layer 24 and/or the clamping devices 56a, 56b. The connector 22 may be located inside the recession 32 of the housing 20 for attaching and/or for connecting the device 12 to the exterior surface 15 of the fixture 14. The exterior surface 42 of the connector 22 may be sized to be receivable by the recession 32 of the housing 20. As a result, the device 12 may abut and/or may be adjacent to the top side 26 of the housing 20. The cable 19 may be retracted inside the retractable reel 18 for securing the device 12 to the housing 20. As a result, the connector 22 may be enclosed between the housing 20 and the device 12 for displaying the device 12 in conjunction with the exterior surface 15 of the fixture 14.

The cable 19 may be located in the opening 36 of the housing 20 for aligning the device 20 in the housing 20. The opening 36 may center the cable 19 with respect to the recession 32, the housing 20 and/or the retractable reel 18. The device 12 may be centered with respect the recession 32, the housing 20 and/or the retractable reel 18 via the opening 36 and/or the cable 19. The system 10 may center the device 12 with respect to the recession 32, the housing 20 and/or the retractable reel 18 via the housing 20, the connector 22 and/or the opening 36. Alternatively, the cable 19 may be removed from the housing 20 via the slit 34 for replacing the device 12 and/or for disassembling the system 10.

The user may exert an outward force with respect to the housing 20 and/or the exterior surface 15 on the device 12, the connector 22 and/or the fastener 21 to separate the device 12 from the housing 20. The device 12, the connector 22 and/or the fastener 21 may moved outward with respect to the recession 32 of the housing and/or the exterior surface 15 of the fixture 14. As a result, the device 12, the connector 22 and/or the fastener 21 may be separated from the recession 32, the housing 20 and/or the exterior surface 15 of the fixture 14 while the cable 19 may secure, may connect and/or may attach the device 12 to the fixture 14 via the retractable reel 18. The cable 19 may extend outward with respect to housing 20 and/or the exterior surface 15 of the fixture 14. The cable 19 may unwind from the retractable reel 18 to move the device 12 outward with respect to the housing 20 and/or the exterior surface 15 of the fixture 14.

The device 12 may be manipulated, may be inspected and/or may be examined by the user while the device 12 and/or the connector 22 may be removed from the recession 32 of the housing 20. The user may examine and/or may inspect a characteristic of the device 12, such as, for example, a texture of the device 12, a weight of the device 12, a configuration of the device 12, a feel of the device 12 and/or the like. The system 10 may allow the user to examine the characteristics of the device 12 while the device 12 may be attached to, may be connected to and/or may be secured to the fixture 14 via the cable 19 and/or the connector 22. The present invention should not be deemed as limited to a specific embodiment of the characteristic of the device 12.

The user may move the device 12 and/or the connector 22 inward with respect to the housing 20, the retractable reel 18 and/or the exterior surface 15 of the fixture 14. The retractable reel 18 may receive and/or may retract the cable 19 as the connector 22 and/or the device 12 move inward with respect to the housing 20 and/or the exterior surface 15 of the fixture 14. The cable 19 may be stored within an interior (not shown in the figures) of the retractable reel 18 for displaying the device 12 in conjunction with the exterior surface 15 of the fixture 14. The recession 32 of the housing 20 may receive the connector 22 to return the device 12 to the housing 20. The connector 22 and/or the device 12 may be centered and/or may be aligned with respect to the recession 32, the housing 20 and/or the retractable reel 18 via the cable 19 and/or the opening 36 of the housing 20. The device 12 may be adjacent to and/or may abut the top side 26 of the housing 20 for displaying the device 12 in conjunction with the exterior surface 15 of the fixture 14. As a result, the device 12 and/or the connector 22 may be returned to the housing 20 and/or the exterior surface 15 of the fixture 14 via the cable 19, the retractable reel 18 and/or the recession 32 of the housing 20.

The retractable reel 18, the cable 19 and/or the connector 22 may attach, may connect and/or may secure the device 12 to the fixture 14. The housing 20 may be attached to and/or may be connected to the exterior surface 15 of the fixture 14 for displaying, for connecting and/or for attaching the connector 22 and/or the device 12 to the exterior surface 15 of the device 12. The housing 20 may have the opening 36, the slit 34 and/or the recession 32 which may be sized to receive the cable 19 and/or the connector 22 for displaying, for connecting and/or for securing the device 12 to the exterior surface 15 of the fixture 14. The fasteners 31a–31d may attach, may secure and/or may connect the housing 20 to the exterior surface 15 of the fixture 14. The fasteners 54a, 54b, the adhesive layer 24 and/or the clamping devices 56a, 56b may attach, may secure and/or may connect the device 12 to the connector 22. The cable 19 may extend outward with respect to the retractable reel 18, the housing 20 and/or the exterior surface 15 of the fixture 14. As a result, the device 12 and/or the connector 22 may be removed from the housing 20 and/or the exterior surface 15 of the fixture 14 to be inspected, to be manipulated and/or to be examined by the user. The device 12 and/or the connector 22 may move inward with respect to the housing 20. The opening 36 may center and/or may align the device 12 and/or the connector 22 with respect to the recession 32, the housing 20 and/or the retractable reel 18.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A system for securing a device to a fixture, the system comprising:
    a housing having a first side and a second side wherein the first side is opposite to the second side wherein the first side of the housing has a recession extending inward with respect to the second side of the housing and further wherein the housing has an opening extending from the recession through the housing to the second side of the housing;
    a cable having a length defined between a first end and a second end wherein the cable extends through the opening of the housing;
    a retractable reel connected to the second end of the cable wherein the retractable reel is adjacent to the second side of the housing wherein the first end of the cable extends from the first side of the housing; and
    a connector having a first side and a second side wherein the first side is opposite to the second side wherein the connector has walls defining an exterior surface wherein the first end of the cable is connected to the connector wherein the device connects to the first side of the connector wherein the recession is sized to receive the connector wherein the first end of the cable moves inward with respect to the housing and further wherein the opening in the housing aligns the connector with respect to the recession.

2. The system of claim 1 further comprising:
    a layer adhered to the first side of the connector wherein the layer attaches the device to the connector.

3. The system of claim 1 further comprising:
    a receptor connected to the connector wherein the receptor has an opening to receive the first end of the cable.

4. The system of claim 1 further comprising:
    a slit formed in the housing wherein the slit receives the cable.

5. The system of claim 1 further comprising:
    a fastener connected to the first end of the cable wherein the fastener attaches the cable to the connector.

6. The system of claim 1 further comprising:
    a fastener extending outward with respect to the exterior surface of the connector wherein the fastener attaches the device to the connector.

7. A system for aligning a device wherein the device is secured to a fixture, the system comprising:
    a housing having a perimeter defined by edges and a length defined between a first end and a second end wherein the first end of the housing has a recession extending inward with respect to the second end of the housing wherein the housing has a slit extending from the perimeter inward with respect to the recession wherein the slit extends from the recession through the housing to the second end of the housing;
    a cable having a length defined between a first end and a second end wherein the cable extends through the housing via the slit wherein the slit is sized to receive the cable wherein the first end of the cable extends from the first end of the housing wherein the second end of the cable is connected to the fixture; and
    a connector having walls defining an exterior surface wherein the first end of the cable is connected to the connector wherein the device is attached to the exterior surface of the connector wherein the first end of the cable moves inward with respect to the recession of the housing wherein the slit of the housing aligns the connector with respect to the recession of the housing wherein the recession of the housing is sized to receive the exterior surface of the connector.

8. The system of claim 7 further comprising:
    a retractable reel attached to the second end of the cable wherein the retractable reel moves the first end of the cable inward with respect to the first end of the housing.

9. The system of claim 7 further comprising:
    a layer adhered to the exterior surface of the connector wherein the layer attaches the device to the exterior surface of the connector.

10. The system of claim 7 further comprising:
    a fastener connected to the first end of the cable wherein the fastener attaches the cable to the connector.

11. The system of claim 7 further comprising:
    a receptor connected to the connector wherein the receptor has an opening to receive the first end of the cable.

12. The system of claim 7 further comprising:
    an attaching means extending from the exterior surface of the connector wherein the connector clamps the device to the connector.

13. A method for securing a device to an exterior surface of a fixture, the method comprising the steps of:
    forming an opening in a housing wherein the housing has a first side and a second side wherein the first side is opposite to the second side wherein the first side of the housing has a recession extending inward with respect to the second side wherein the opening extends from the recession through the housing to the second side of the housing;
    inserting a cable into the opening of the housing wherein the cable has a length defined between a first end and a second end wherein the first end of the cable is connectable to the fixture and the second end extends from the first side of the housing;
    connecting the first end of the cable to a connector having walls defining an exterior surface wherein the recession of the housing is sized to receive the exterior surface of the connector; and
    aligning the connector with respect to the recession via the cable and the opening in the housing wherein the first end of the cable and the connector move inward with respect to the first side of the housing wherein the connector is insertable into the recession of the housing.

14. The method of claim 13 further comprising the step of: attaching the housing to the exterior surface of the fixture.

15. The method of claim 13 further comprising the step of: adhering a layer to the exterior surface of the connector.

16. The method of claim 13 further comprising the step of: attaching the device to the connector.

17. The method of claim 13 further comprising the step of: connecting the first end of the cable to the connector.

18. The method of claim 13 further comprising the step of: forming a slit in the housing wherein the slit extends from the recession through the housing to the second side of the housing wherein the slit receives the cable.

19. The method of claim 13 further comprising the step of: displaying the device on the exterior surface of the fixture.

20. The method of claim 13 further comprising the step of: removing the cable from the opening in the housing.

* * * * *